Patented June 2, 1942

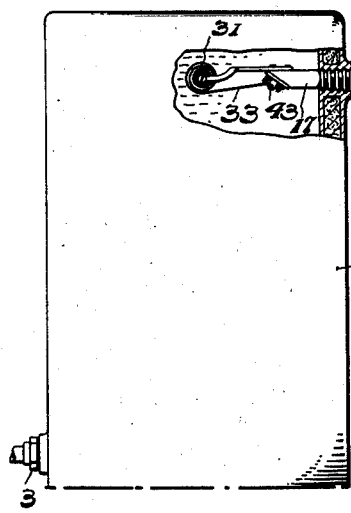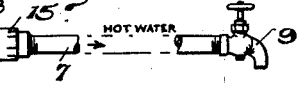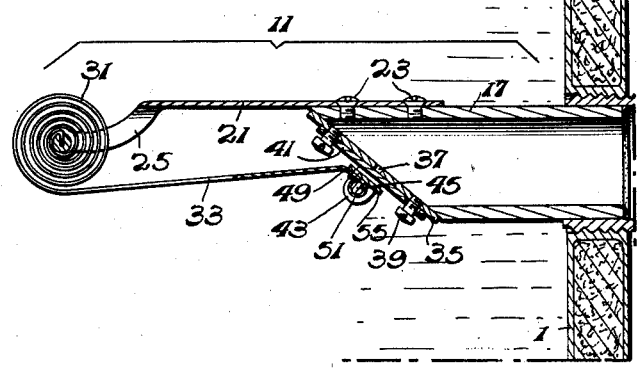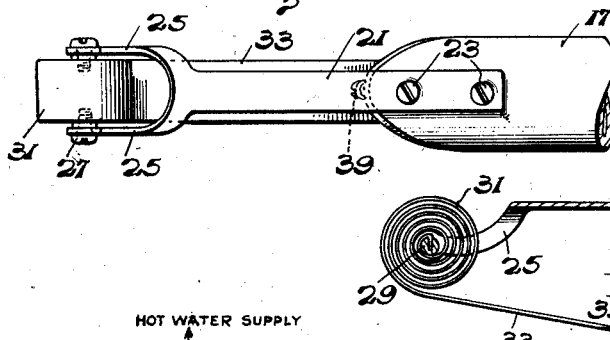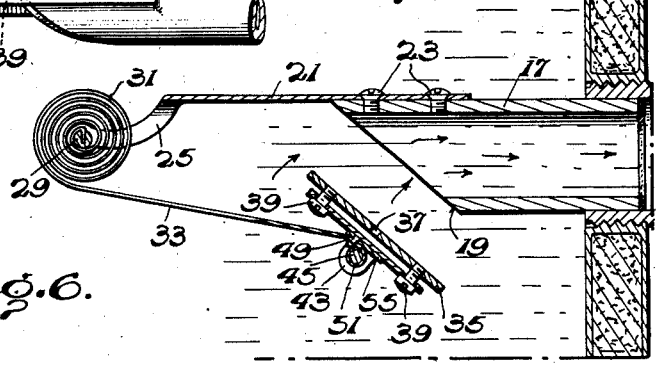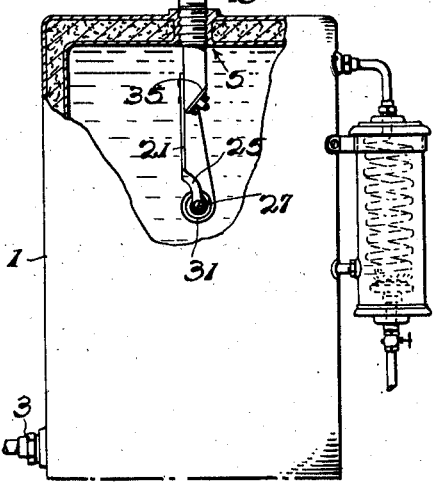

2,285,305

UNITED STATES PATENT OFFICE 2,285,305

VALVE

James P. Reid, Raleigh, N. C.

Application June 24, 1941, Serial No. 399,547

3 Claims. (Cl. 236—93)

This invention relates broadly to apparatus for use in hot water systems whereby the consumption of the water therein may be automatically controlled.

In its more specific aspects my invention consists of a valve structure designed for installation in a hot water system and which will only operate to permit flow of water therefrom when the water is heated to a predetermined temperature to thereby conserve water and the energy of whatever kind which may be utilized for heating the water.

It is therefore an object of my invention to provide means within a hot water system for conserving water.

It is a further object of my invention to provide means within a hot water system for conserving fuel required to heat the water.

A further object of my invention is to provide means within a hot water system which will only permit withdrawal of water therefrom after the water has reached a predetermined temperature.

Another object of my invention is to provide means within a hot water system to govern the flow of water therefrom which is entirely automatic in operation.

It is also an object of my invention to provide means within a hot water system for controlling the flow of water therefrom which may be installed with facility and at small expense and which because of its arrangement within the system and because of its structure will not be subject to the usual eroding effects of flowing water.

It is also an object of my invention to provide an outlet control valve within a hot water system which is formed of few operating elements and which will operate to completely close the outlet under certain conditions and which under certain other conditions will operate to open the outlet for free unobstructed flow of water therefrom.

It is also an object of my invention to provide an outlet control valve within a water system which will not cause water hammers or undesirable noises to occur upon its operation to open and close the water outlet.

With the foregoing general objects, features, and results in view, as well as certain others which will be apparent from the following explanation, the invention consists in certain novel features and design, construction, mounting and combination of elements, as will be more fully and particularly referred to and specified hereinafter.

Referring to the accompanying drawing:

Fig. 1 is a view in elevation of a hot water tank with the valve structure of the invention mounted in the side thereof.

Fig. 2 is a side view in section of the valve structure with the valve in position closing the outlet.

Fig. 3 is a top view of the valve structure.

Fig. 4 is a side view in section of the valve structure with the valve in position opening the outlet.

Fig. 5 is a perspective view of the elements of the valve in disassembled position.

Fig. 6 is a view in elevation of a hot water tank with the valve structure mounted in the top thereof.

In the usual type of hot water systems in which a tank is used for storing the heated water, the outlet from the tank to the various faucet controlled hot water outlets is open at all times for the flow of water regardless of the temperature of the water being drawn. It is a common occurrence in such hot water systems that all of the heated water within the tank has been consumed and time is required for raising the temperature of the water within the tank, or it may be that the water heating means has not been in operation so that a time interval is required to provide a body of heated water within the tank. Thus during such periods when water of a desired temperature is not available it is possible in systems now in use to operate a hot water faucet to draw water therefrom whether it is hot or cold.

Now it is usual practice to let the cold or tepid water continue to flow from the hot water faucet until, through the action of the heating means a body of water heated to the desired temperature is provided in the tank. In such systems it will be apparent that great wastage of water results from the uncontrolled flow of water from a hot water faucet during the period the water is being heated and it will be equally apparent that considerable more fuel is required to heat the water to the proper temperature. There is therefore in addition to waste of water a waste of fuel required for heating the water, and this is so because with the faucet open and the water flowing from the tank before it is properly heated the water which is partially heated will be drawn off first and a flow of cold water will be constantly entering the tank, this cold water must be heated which of course requires more heat than completing the heating of the partially warm water. There is therefore practically complete wastage of the heat energy required for raising the temperature of the warmed water which is drawn out of the tank.

I have overcome this problem of water and fuel wastage in hot water systems by installing within the hot water storage tank means for opening and closing the water outlet therefrom according to the temperature of the water. I have devised a valve which is installed in the tank outlet conduit and projects into the water within the tank and is operable automatically to close the tank outlet when the temperature of the water is below a certain predetermined degree and is operable automatically to open the outlet when the temperature of the water reaches the predetermined level. The apparatus may be set to operate when the water reaches any desired temperature. Hence, with my apparatus installed within a hot water system, water may only be drawn when the water has reached a desired temperature, the opening of a faucet when the water has not been sufficiently heated will not cause a flow of water from the system. It is to be understood therefore that the apparatus is entirely automatic in its operation and is not under control of the users of water. Hence, wastage of fuel and water is definitely eliminated.

Referring to the drawing I have used the numeral 1 to designate any desired type of hot water storage tank in a hot water system, having a cold water inlet 3 adjacent the bottom thereof and an opening 5 in the side wall adjacent the top thereof through which the hot water outlet line runs. In Fig. 1 of the drawing I have shown a hot water distribution line 7 and a faucet or tap 9 at the end thereof, and it is to be understood that while I have only disclosed one distribution line and one faucet there are a plurality of these in the usual system of this general type.

The opening 5 in the tank is preferably threaded to receive therethrough for removable mounting therein the valve structure which I shall designate generally by the numeral 11. The valve structure includes as a unit the valve members, the valve operating elements and the means for mounting the structure in the tank, the latter comprising a tubular union element 13 externally threaded at both ends. The union element is adapted to screw into the opening 5 in the tank and to receive on its outer end a coupling 15 which is carried on the end of the line 7 to thereby connect the union with the water distribution line. A relatively short tubular member or nipple 17 of smaller diameter than the union is mounted in and carried by the union. One end of the tubular section 17 extends into the inner end of the union element and is fixed therein by soldering or in any other desirable manner. Thus the short tubular member is connected to and carried by the union element for projection therefrom into the tank interior and into the water stored therein, and a conduit is provided through which water may flow from the tank into the distribution line 7 to and out of the faucet 9. While I have shown a union element and a short tubular member I do not intend my invention to be limited to this particular arrangement, as a single tubular member could be used and fall within the spirit and scope of my invention.

The inner end or orifice of the tubular member 17 which is disposed within the tank is cut obliquely to form an inclined annular surface or valve seat 19 for a purpose to be hereinafter particularly described. The union element and tubular member are so positioned within the tank that the annular valve seat will be downwardly directed as will be made clear by consideration particularly of Figs. 2 and 4 of the drawing.

I provide a post or shank 21 which is secured to the uppermost surface of the tubular member 17 by means of screws 23 or the like and is designed to extend longitudinally therefrom a distance into the tank 1, and is of yoke or fork-like structure at its innermost end to provide two downwardly curved and inwardly extending laterally spaced arms 25. Openings are formed adjacent the inner ends of each arm 25 for receiving adjusting screws 27 between which is supported a slotted hub 29. A thermostat spring 31 is coiled about the hub and one end of the spring is disposed in the hub slot for fastening therein and the other end 33 of the spring is free of the coiled portion thereof and extends toward the inclined annular face of the tubular member below the plane of the shank 21, forming a portion of a temperature controlled member extending toward the tubular member.

The free uncoiled length 33 of the thermostat spring is adapted to support the valve unit and since the coiled spring is effected by temperature variations it is therefore adapted to actuate the valve unit to open and close the orifice of the tubular member as a result of temperature changes of the water contained within the tank. The thermostat spring may be adjusted to actuate the valve unit at any desired water temperature merely by adjusting the screws 27 to thereby relieve or increase the tension of the coiled spring.

The valve unit comprises a main valve 35 of substantially the same shape as the obliquely cut end of the tubular member upon which it is adapted to seat when in closed position. The main valve is provided with a relatively small centrally arranged opening 37 therein and has two spaced oppositely disposed upstanding headed pins 39 mounted thereon adjacent to but inwardly spaced from the edges thereof. An auxiliary or relief valve member 41 of generally similar contour to that of the main valve, only on a smaller scale, and having oppositely disposed upstanding ears 43 extending from the edges thereof between which a pin 45 is mounted, comprises a further element of the valve unit. Oppositely disposed openings 47 are formed in the relief valve in position therein complementary to the headed pins 39 for receiving said pins when the valve unit is assembled as hereinafter particularly described.

The end of the free spring 33 is obliquely bent to form a downwardly extending base portion 49 which as will be made clear hereinafter has substantially the same inclination and is substantially parallel to the line of inclination of the annular valve seat 19 of the tubular member 17 when the valve unit is in closed position. The end of the base portion 49 is loosely rolled around the pin 45 as shown at 51 so that the pin may rotate relative to the roll of the spring for rocking movement of the valves, and a rectangular plate member 53 is secured by riveting or the like to the under side of the base portion and extends outwardly beyond the pin 45 as shown at 55.

Thus the valve unit which I have provided comprises the main valve 35 to which the relief valve 41 is secured by means of the headed pins 39 for relative movement with respect thereto due to the length of the pins which permit movement of the relief valve between the heads of the pins and the main valve. Hence, when the relief valve is in position in overlying engagement with the main valve it will be apparent that the opening 37 will be closed. The valve unit is mounted on and carried by the spring 33 by the arrangement described, wherein the end of the spring is bent around the pin 45 to thereby connect and support the unit from the spring through the roll 51, pin 45, ears 43 and pins 39. The end of the spring is so rolled about the pin 45 and the plate 53 is of such thickness that there may be relative movement between the plate and the relief valve. With the valve unit assembled and carried by the thermostat spring it is to be understood that there may be limited substantially independent movement between the various elements.

In many hot water systems the hot water outlet is provided in the side wall of the tank as shown in Fig. 1 of the drawing in which case the valve structure is mounted in the tank outlet with shank or post 21 in position above the free end 33 of the spring, however, as disclosed in Fig. 6 of the drawing the hot water outlet is provided in the top of the tank in which case the valve structure may be mounted therein to project downwardly into the tank and water and will operate in this position with the same results as when in the position shown in Fig. 1 of the drawing.

After having set the thermostat spring by means of the adjusting screws provided for that purpose to cause the spring to retract or open the valve when the water in the tank has reached the temperature for which the spring is set, hot water may be drawn from a faucet in the system. Upon a temperature drop below that for which the thermostat is set the spring will be effected thereby to swing the valve into position with the main valve seated against the annular valve seat 19 thereby closing the outlet from the tank. Due to the action of the spring the main valve will bear tightly against the valve seat, likewise the relief valve will tightly engage the main valve thereby closing the opening therein. Since the spring is resilient there will be a certain amount of lateral swinging thereof and when the main valve is approaching the valve seat it may be somewhat out of line therewith, however the suction of the water flowing out of the tank through the tubular member and the distribution line will urge the valve into proper seated position on the end or seat of the tubular member. Due to the particular bending of the base portion of the spring to have substantially the same inclination as that of the end of the valve seat it will be understood that the valves will thereby be inclined at substantially this same angle and therefore will evenly engage the valve seat without any objectionable slapping noises. Further facilitating the proper seating of the valve unit and cooperating with the suction produced by the flow of water through the tubular member is the particular and important arrangement of the structure wherein the coiled spring is mounted on a substantially longitudinal line with respect to the tubular member so that the extending portion of the spring extends substantially longitudinally toward the orifice of the tubular member all of which urges the valve unit into proper seating position.

When the temperature of the water falls to a predetermined degree the thermostat will be affected thereby to swing the free length of spring toward the tubular member to seat the valves and thereby close the outlet from the tank, and upon raising the temperature of the water to a predetermined degree the thermostat will be affected and the free length of spring will tend to move away from the tubular member and will first operate sufficiently to lift the relief valve on the pins away from the main valve thereby uncovering the opening 37 therein in this manner the suction within the tubular member will be relieved sufficiently to permit the spring in its swinging movement to unseat the main valve to permit free flow through the tubular member.

In opening and closing operations it is necessary to limit the rocking movement of the main and relief valves relative to the spring, this I have done by means of the plate 53 and its projecting portion 55 which is engaged by the relief valve upon limited rocking movement to prevent further rocking of the valves. A limited amount of rocking of these elements is desirable in lending flexibility to the seating of the valve, but such movement must be controlled for unlimited rocking would not permit of proper seating of the valve.

What I claim is:

1. In a valve structure, a tubular member having one end obliquely cut to form an inclined valve seat, a post mounted on the uppermost surface of said tubular member to project longitudinally therefrom, a coiled temperature affected member carried on the inner end of said post and having a portion thereof extending toward said tubular member below said post, a valve unit mounted on the end of said portion of the temperature affected member for actuation thereby, said valve unit comprising a main valve having an opening therein and a relief valve connected to said main valve for limited relative movement with respect thereto under the influence of said temperature affected member.

2. In a valve structure, a tubular member having one end obliquely cut to form an inclined valve seat, a valve actuating temperature affected member supported on said structure at a point removed from said tubular member, a valve unit loosely mounted on and carried by said temperature affected member for actuation thereby to open and close the tubular member, said valve unit comprising a main valve having an opening therein and a relief valve loosely connected to the main valve for limited relative movement with respect thereto.

3. In a valve structure, a tubular member having one end obliquely cut to form an inclined valve seat, a post mounted on the uppermost surface of said tubular member and projecting longitudinally therefrom and having a yoke-like structure at its inner end, a coiled valve actuating temperature affected member carried in the yoke-like structure and having a portion projecting from said yoke-like structure toward the tubular member, a valve unit mounted on said portion of the temperature affected member for actuation thereby and in position thereon retained at substantially the same angle of inclination as the angle of inclination of said valve seat, said valve unit comprising a main valve, and a relief valve connected to said main valve for limited movement relative thereto, the relief valve being loosely mounted on the portion of the temperature affected member for limited rocking movement relative thereto, and a relief valve engaging plate secured to said portion of the temperature affected member for limiting the rocking of the valve unit relative to said portion of the temperature affected member.

JAMES P. REID.